Dec. 20, 1955     D. T. BLATHERWICK     2,727,431
AUTOMATIC FOCUSING DEVICE
Filed Nov. 12, 1952     2 Sheets-Sheet 1
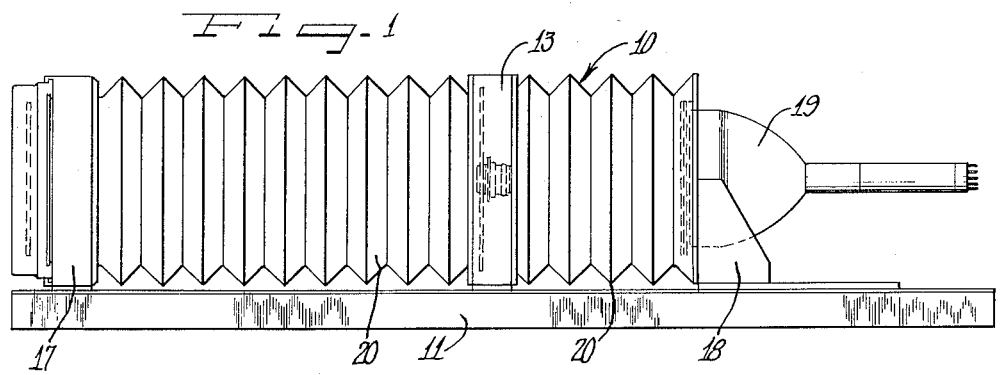
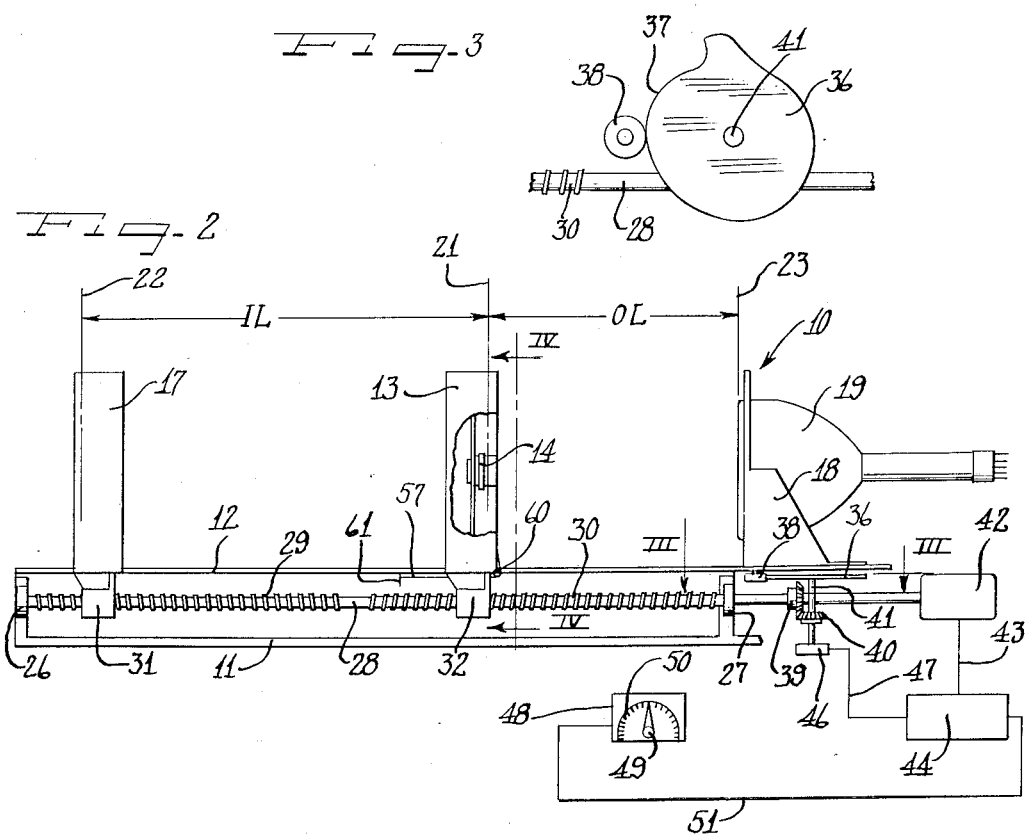
Inventor
Delbert T. Blatherwick Dec. 20, 1955 D. T. BLATHERWICK 2,727,431
AUTOMATIC FOCUSING DEVICE
Filed Nov. 12, 1952 2 Sheets-Sheet 2

Inventor
Delbert T. Blatherwick

United States Patent Office 2,727,431
Patented Dec. 20, 1955

2,727,431

AUTOMATIC FOCUSING DEVICE

Delbert T. Blatherwick, Chicago, Ill., assignor, by mesne assignments, to Robertson Photo-Mechanix, Inc., a corporation of Illinois Application November 12, 1952, Serial No. 320,087

15 Claims. (Cl. 88—24)

This invention relates generally to photographic apparatus and more particularly to an optical system for use in an automatic focus camera or for use in an electronic color-separation device such as may be advantageously employed in the graphic arts.

In a typical camera environment to which the principles of the present invention may be effectively applied, a lens having a predetermined focal length is located between a sensitized material such as a sheet of photographic film and an object such as might be represented by the visible characters on the face of a kinescope tube. In an arrangement of this nature, the relationship between the sensitized material, the lens and the kinescope tube is determined by a scaling system in order to insure a proper focal alignment.

In optical terms, image and object planes are provided which are conjugate to each other with respect to the optical lens therebetween.

For any selected ratio of image to object reduction or enlargement, the image extension and the object extension relative to the optical lens must be appropriately varied.

For example, in the environment of an automatic focus camera, the image extension is directly proportional to the focal length of the lens and the ratio of reduction or enlargement whereas the object extension is directly proportional to the focal length of the lens and inversely proportional to the ratio of reduction or enlargement.

In analyzing the optical requirements of such an arrangement, it has been determined that the difference between each ratio setting for the image extension produces a difference in the length of the image extension which is linear in relationship to the ratio change.

With regard to the difference between each ratio setting for the object extension, the difference between the object extension and the ratio change is non-linear.

Heretofore, those versed in the art have provided extremely complex and expensive mechanism to selectively change the image extension and the object extension in order to maintain the mathematically precise optical requirements of a proper focal relationship.

In accordance with the principles of the present invention, all necessary adjustments are conveniently effected through the single setting of only one adjustment device. Moreover, the apparatus employed is extremely simple and can be conveniently fabricated from a reduced number of simplified elements.

According to the principles of the present invention, the automatic focusing arrangement utilizes an optical system having image and object conjugates coaxially aligned with a lens member therebetween to provide an image axis and an object axis each being of predetermined length.

Means are provided for varying the lengths of the image axis and the object axis to control the ratio of reduction or enlargement of the object and image conjugates with a linear relationship between the variations in the respective lengths. Compensating means are further provided to adjust the variation in the respective length of one of the axes in a predetermined non-linear relation to the linear length variations.

In other words, the image and object conjugates comprise a first carrier having sensitized film therein and a second carrier having a kinescope tube therein respectively. Furthermore, the lens member is mounted on a movable lens carrier. The image and object axes are selectively varied in a linear relationship by a differential screw which is drivingly connected to the film carrier and the lens carrier. The compensating means comprise a cam having a predetermined generated working surface drivingly engaging the object carrier or kinescope tube carrier. A common drive motor is provided to rotate the screw and the cam so that the changes in length of the object and image axes and the compensating adjustment of one of the lengths will be effected simultaneously. The common drive motor is preferably incorporated in a balanced bridge circuit and takes the form of a slave motor controlled by a master motor actuated by an adjustment device calibrated in terms of image to object size ratios so that a single adjustment of the actuator will effect all of the adjustments required.

The present invention further contemplates the provision of an adjustable iris diaphragm for the lens having a rotatable actuating ring for changing the diameter of the lens aperture and including drive coupling means between the actuating ring and the frame of the automatic focusing device so that the actuating ring will be adjustably rotated to automatically change the size of the lens aperture whenever the lens carrier is linearly displaced relative to the frame.

It is an object of the present invention, therefore, to provide an automatic focusing apparatus which overcomes the deficiencies of the prior art.

Yet another object of the present invention is to provide an automatic focusing arrangement wherein all adjustments are effected with only a single setting of a single actuating device.

A further object of the present invention is to provide an optical system wherein conjugate image and object extensions are varied with a linear relationship between the respective length changes and wherein one of the extensions is varied in a predetermined non-linear relation to the linear length variations.

A further object of the present invention is to provide an automatic focusing device which may be economically produced from a reduced number of simplified structural components.

A further object of the present invention is to provide an automatic focusing camera which can be effectively operated by relatively unskilled personnel.

Many other features, advantages and additional objects of the present invention will become manifest to those versed in the art upon making reference to the detail description which follows and the accompanying sheets of drawings in which a preferred structural embodiment of a camera apparatus incorporating the principles of the present invention is shown by way of illustrative example.

On the drawings:

Figure 1 is a fragmentary elevational view of a camera apparatus showing the automatic focusing mechanism of the present invention;

Figure 2 is a fragmentary elevational view with parts removed and showing additional components in diagrammatic form illustrating additional details of construction of the automatic focusing mechanism shown in Figure 1;

Figure 3 is a fragmentary plan view taken generally on line III—III of Figure 2;

As shown on the drawings:

Figure 4:
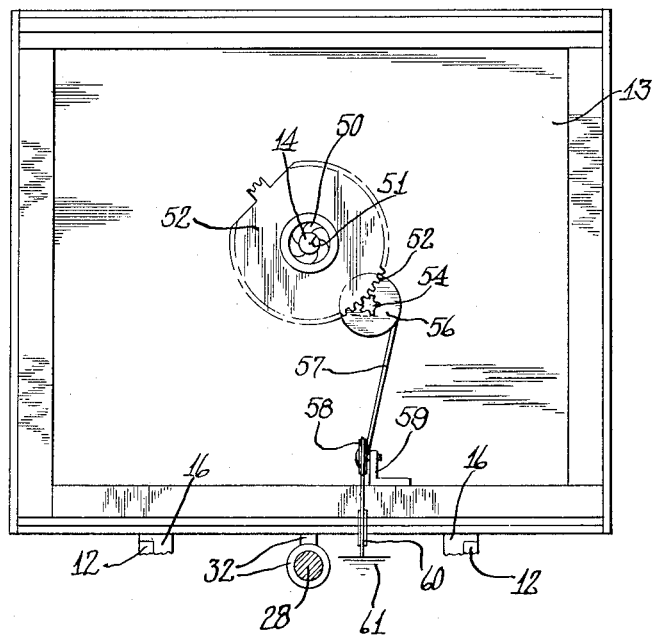
Figure 4 is a view of the lens holder provided in accordance with the principles of the present invention and is taken generally on line IV—IV of Figure 2.
Figure 5:
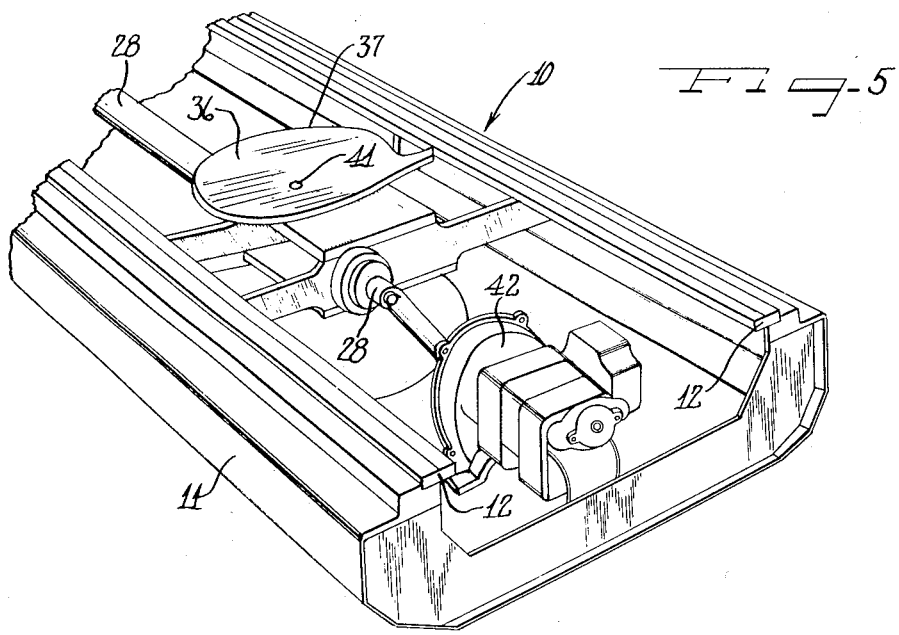
Figure 5 is a fragmentary perspective view of an actual commercial embodiment of the apparatus shown in Figures 1 and 2 and illustrates additional details of construction of the apparatus provided.

Although the principles of the present invention are applicable to many different phases of the graphic arts including process cameras and the like, the principles of the present invention are disclosed herein by way of illustrative example in connection with their application to an automatic focusing camera apparatus illustrated generally by the reference numeral 10.

A stationary frame 11 having considerable longitudinal extent is provided and carries a pair of transversely spaced tracks indicated at 12. A lens holder or carrier 13 is provided and retains a photographic or optical lens member 14 in a proper plane. The lens holder 13 is movably mounted on the frame 11 and includes runner members 16 (Figure 4) which slidingly engage the tracks 12.

On one side of the lens holder 13, a second carrier or holder member is supported by the frame 11 and is indicated by the reference numeral 17. In the particular embodiment herein described, the holder 17 comprises a sensitized material carrier which is adapted to support sensitized photographic material in a proper plane. The sensitized material carrier or holder 17 is also movably mounted on the frame 11 and includes runners which slidingly engage the tracks 12.

A third carrier or holder is indicated at 18 and will be referred to in connection with the description of the preferred embodiment herein described as an object carrier or holder which is adapted to support and hold the medium to be copied photographically. The present embodiment contemplates the provision of a kinescope tube 19 supported in the holder 18 and carried by the frame 11 on the other side of the lens holder 13.

The holder 18 is also movably mounted relative to the frame 11 and is preferably provided with runners which slidingly engage the tracks 12.

As shown in Figure 1, suitable bellow members indicated at 20 may be provided between the lens holder 13, the image holder 17 and the object holder 18.

Proper optical terminology may be applied to the structural embodiment herein described by making reference to Figure 2. The lens optical center is indicated at 21 and the image plane provided by the sensitized photographic material carried in the image holder 17 is indicated by the reference numeral 22. The object plane 23 is represented by the face of the kinescope tube 19. In the optical system shown, the image plane 22 and the object plane 23 are conjugate to each other with respect to the optical lens 14 therebetween.

The so-called copy extension or image axis is shown as being equal to the distance IL, the distance between the image plane and the lens optical center.

The object axis or object extension is shown as being equal to the distance OL, the distance between the lens optical center 21 and the object plane 23.

In an optical system such as the illustrative embodiment herein shown, the distance IL is computed by the formula:

$$IL = FL(R+1)$$

The distance OL is computed by the formula:

$$OL = FL\left(\frac{1}{R}+1\right)$$

In both formulas, the symbols employed are defined as follows:

$IL$ = the distance between the image plane 22 and the lens optical center 21

$OL$ = the distance between the lens optical center 21 and the object plane 23

$FL$ = the focal length of the optical lens 14

$R$ = the ratio of reduction or enlargement of the image to the object

In order to selectively change the ratio of reduction or enlargement of the image to the object, it is necessary to selectively vary the lengths of IL and OL. It has been determined that the difference between each ratio setting for the distance IL is linear in relationship to the ratio change, while the difference between each ratio setting for the distance OL is non-linear in relationship to the ratio change. This is clearly illustrated by considering representative values of R, IL, OL and the respective differences in an optical system as shown in Figure 2 wherein a lens 14 is employed having a focal length of 10″ ($FL=10$).

Chart No. 1

| Ratio (R) | Distance IL | Difference | Distance OL | Difference |
|---|---|---|---|---|
|  | Inches | Inches | Inches | Inches |
| 1:1 | 20 | 0 | 20 | 0 |
| 1.25:1 | 22.5 | 2.5 | 17.847 | 2.153 |
| 1.5:1 | 25 | 2.5 | 16.550 | 1.297 |
| 1.75:1 | 27.5 | 2.5 | 15.604 | .946 |
| 2:1 | 30 | 2.5 | 14.890 | .714 |

Since the actual quantitative value of adjustment of IL and OL for different values of R is very close to a linear relationship, it is contemplated in accordance with the principles of the present invention to selectively vary IL and OL with a linear relationship between the respective variations in IL and OL. (Note.—IL linear on enlargement and OL linear on reduction—only enlargement range illustrated above.) To accomplish that end, the frame 11 is provided with a bearing 26 and a bearing 27 rotatably journaling a drive shaft 28. The drive shaft 28 has a pair of longitudinally spaced threaded portions indicated at 29 and 30, respectively, together forming a differential screw. It will be understood that the threaded portions 29 and 30 are of opposite hand in accordance with differential screw practice.

The image holder 17 is provided with a bracket 31 having an appropriately threaded aperture mating with the threaded portion 29 so that the image holder 17 will be axially advanced in selected direction upon rotating the drive shaft 28 in alternate angular direction.

The lens holder 13 is provided with a bracket 32 also having an appropriately threaded aperture mating with threaded portion 30 on the drive shaft 28. Thus, when the drive shaft 28 is rotated in selected angular direction, the lens holder 13 will be axially advanced in alternate direction.

By maintaining the object holder 18 stationary with respect to the frame 11 and by selectively varying IL and OL by moving the lens holder 13 and the image holder 17 with the differential screw provided on the drive shaft 28, a linear relationship between the variations in the respective lengths of IL and OL would be maintained. In this connection, the following figures are given as exemplary.

Chart No. 2

| Ratio | Distance IL | Linear Travel | Distance OL | Linear Travel | Linear Distance |
|---|---|---|---|---|---|
|  | Inches | Inches | Inches | Inches | Inches |
| 1:1 | 20 | 0 | 20 | 0 | 20 |
| 1.25:1 | 22.5 | 2.5 | 17.847 | 1.25 | 18.75 |
| 1.50:1 | 25 | 5 | 16.550 | 2.5 | 17.5 |
| 1.75:1 | 27.5 | 7.5 | 15.604 | 3.75 | 16.25 |
| 2:1 | 30 | 10 | 14.890 | 5.0 | 15.00 |

By comparing the figures of Chart No. 1 and Chart No. 2, it will be noted that an error has been introduced which keeps the components of the system out of proper focal relationship. This is because the variations in the length of the object axis OL should be non-linear in relation to the linear length variations effected by the differential screw. The actual amount of error indicated is illustrated by the figures of Chart No. 3.

*Chart No. 3*

| Ratio | Error |
| --- | --- |
| | Inches |
| 1:1 | 0 |
| 1.25:1 | −.903 |
| 1.50:1 | −.950 |
| 1.75:1 | −.646 |
| 2:1 | −.110 |

In order to provide the necessary compensation in the length of OL, it is contemplated in accordance with the principles of the present invention to adjust the variation in the length of OL in non-linear relation to the linear length variations. To effect this function, there is provided a cam member 36 having a generated working surface 37 following a predetermined contour and engaging a follower 38 which engages the object holder 18 and moves same along the tracks 12 a sufficient distance to maintain the object holder 18 in proper focus relation to the lens 14.

In the embodiment herein described the contour of the working surface 37 on the cam member 36 conforms to a curve (non-linear in character) which will effect the proper correction of the errors indicated in Chart No. 3.

For the particular cam contour 37, the following exemplary figures may be noted:

*Chart No. 4*

| Ratio (R) | Cam Rotation |
| --- | --- |
| | Degrees |
| 1:1 | 0 |
| 1.25:1 | 46.54 |
| 1.50:1 | 93.09 |
| 1.75:1 | 139.64 |
| 2:1 | 186.18 |

The cam member 36 is preferably driven by the drive shaft 28 and to effect rotation of the cam member 36 the drive shaft 28 is provided with a bevel gear 39 meshing with a bevel gear 40 mounted on the cam axle 41. Thus, the linear variations of IL and OL and the compensation of OL occur simultaneously.

The control of the drive means provided in accordance with the principles of the present invention is effected by a balanced bridge control system including a slave motor 42 having a driving connection with the drive shaft 28. The slave motor 42 is electrically coupled as at 43 to an electronic differentiating circuit and master motor control indicated diagrammatically at 44. A slave control unit is also shown at 46 connected to the cam axle 41 and is electrically coupled as at 47 to the electronic differentiating circuit and master motor control 44.

An actuating device for the master motor control 44 is shown at 48 and includes an adjustment knob 49 which may be selectively rotated to an angular displacement corresponding to a selected value of R, the ratio of reduction or enlargement. It will be understood that the angular displacement of the adjustment knob 49 is calibrated in terms of values of R as is shown by the indicia indicator 50 on the front of the device 48. The actuating device 48 is electrically coupled to the master motor control 44 as shown at 51.

By virtue of the arrangement thus provided, the entire focusing operation can be effected by the simple adjustment of the knob 49 to a selected value of R. Actuation of the master motor control 44 will unbalance the circuit so that the slave motor 42 will move to balance the circuit whereupon the drive shaft 28 will be rotated by the slave motor 42 and the image holder 17, the lens holder 13 and the object holder 18 will be moved so as to automatically assume the proper focal relationship required for the selected value of R.

Those versed in the art will also appreciate that it is frequently desirable to change the size of the lens aperture in conjunction with adjustments to an optical system as herein described. According to the principles of the present invention, the size of the lens aperture is automatically controlled without requiring any separate manual adjustment.

As shown in Figure 4, an adjustable iris diaphragm 50 controls the diameter of a lens aperture 51 for the lens 14 and is provided with a rotatable actuating ring 52 having gear teeth 53 cut on the peripheral edge thereof. A pinion gear 54 is carried by the lens holder 13 and meshes with the gear teeth 53 on the ring 52.

The pinion 54 rotates with a spring biased cord reel pulley 56 also carried by the lens holder 13. A cord 57 leads off of the cord reel pulley 56 and is trained over a pulley wheel 58 carried by a bracket 59 and over a pulley wheel 60 whereupon the free end of the cord 57 is firmly connected to the frame as is indicated at 61. Thus, whenever the lens holder 13 is longitudinally displaced relative to the frame 11, the cord reel pulley 56 will be rotated and the pinion 54 will drive the actuating ring 52 so as to adjust the size of the lens aperture 51.

Although various minor structural modifications might be suggested by those versed in the art, it should be understood that I wish to embody within the scope of the patent warranted hereon all such modifications as reasonably and properly come within the scope of my contribution to the art.

I claim as my invention:

1. An optical system comprising, a lens holder, a lens in said lens holder, a sensitized material holder on one side of said lens forming an image plane, an object holder on the other side of said lens forming an object plane, said image and object planes being conjugate to each other with respect to the lens therebetween, a differential screw having a pair of spaced threaded portions of opposite hand connected in driving relationship to said sensitized material holder and to said lens holder, respectively, driving means rotating said differential screw and moving said holders to vary the spacing of each respective conjugate with respect to said lens in linear relationship, and a cam having a driven relationship with said driving means and engaging said object holder to produce additional movement thereof, said cam having a working surface engaging said object holder and being formed to provide compensating movement in a predetermined non-linear range for maintaining said object holder in proper focus relation to said lens.

2. An automatic focusing mechanism comprising, a differential screw having a pair of longitudinally spaced threaded portions, a film holder driven by one of said threaded portions, a lens holder driven by the other of said threaded portions, an object holder, a cam having a driving connection with said object holder, and a common driving motor to simultaneously rotate said screw and to actuate said cam, said threaded portions being of opposite hand and adjusting said lens holder and said film holder with a linear relationship between the variations in adjustment, said cam having an actuating face moving said object holder in compensating relationship relative to said linear adjustments of said lens holder and said film holder to maintain said object holder in proper focus relation to said lens holder.

3. An automatic focusing device comprising, a frame having a trackway thereon, a lens holder on said trackway and carrying a lens member therein, a film holder on said trackway on one side of said lens and adapted to carry a sensitized film therein, a tube holder on said trackway on the other side of said lens and adapted to carry a kinescope tube therein, said film and tube holders being conjugate to each other with respect to said lens member therebetween, driving means connected to said holders and changing the length of the respective conjugate axes with a linear relationship between the respective length changes, said driving means including compensating means moving said object holder in a predetermined non-linear relation to the said length changes, said driving means having a differential screw drivingly connected to two of said holders for axially advancing the holders in selected direction, and said compensating means having a cam provided with a generated working face engaging the other of said holders and adjusting the corresponding conjugate axis in a predetermined non-linear relation to the said length changes.

4. In an automatic focusing device, a copyholder, a lens holder having a lens therein, an object holder, said copy and object holders being conjugate to each other with respect to said lens therebetween, movable mounting means carrying said holders, driving means moving said movable holders to control the ratio of reduction or enlargement, an adjustable iris diaphragm for said lens having a rotatable actuating ring for changing the diameter of the lens aperture, said ring being provided with an external contact area on a circular arc concentric with said ring and drive coupling means between said actuating ring and a relatively stationary support adjustably rotating said ring to automatically change the size of the lens aperture whenever the lens holder is linearly displaced relative to the stationary support, said drive coupling means including a rotatable reel having secured thereto a drive wheel, said drive wheel being provided with a circular contact area which engages the circular contact area on the actuating ring to rotate the latter on rotation of the reel, and a cord having one end connected to said relatively stationary support and the other end connected to said reel.

5. In an optical system, the combination of a lens holder and object and image plane holders on opposite sides respectively of said lens holder, differential screw means for changing the relative distances between adjacent holders, said screw means having two different screw threads each of fixed pitch for respectively driving two adjacent holders, actuating means coupling said differential screw means to the third holder for moving said third holder with respect to the adjacent holder, said actuating means having a predetermined non-linear driving effect upon said third holder with reference to movement of said differential screw means and means for rotating said differential screw whereby a prescribed ratio of object and image distances from said lens holder will be maintained automatically upon operation of said differential screw means.

6. The combination according to claim 5 wherein said actuating means include cam and cam follower means.

7. The combination according to claim 5 wherein an adjustable diaphragm is carried by said lens holder for controlling the lens aperture; means for adjusting said diaphragm and driving means coupled between said diaphragm adjusting means and a relatively stationary point in said system for changing the diaphragm setting in a manner corresponding to the position of said lens holder with respect to the remaining two holders.

8. The combination according to claim 5 wherein said lens holder carries an adjustable iris diaphragm having a rotatable actuating ring for changing the lens aperture and means for rotating said diaphragm ring to change the lens aperture in accordance with the position of the lens holder, said last named means including a cord having one end attached to a stationary support, a rotatable reel having the other end of the cord attached thereto, said reel having means for rotating said diaphragm ring on rotation of the reel.

9. In an optical system, the combination of a lens holder and object and image plane holders on opposite sides of said lens holder, track means for supporting said three holders in aligned relationship, a differential screw having two different screw threads each of fixed pitch disposed parallel to said tracks, threaded means coupling the lens holder to one part of said differential screw, threaded means coupling another holder to the remaining part of said differential screw so that turning of said differential screw results in a differential variation of distances between the lens holder and said other holder, actuating means coupling said differential screw and said third holder for moving said third holder along said tracks with movement of said differential screw, said last named actuating means including means for providing a non-linear driving ratio between angular movement of said differential screw and displacement of said third holder with respect to said tracks, and means for rotating said differential screw whereby a prescribed ratio of object and image distances will be maintained automatically upon movement of said differential screw.

10. The combination according to claim 9 wherein said non-linear means includes a cam actuated upon rotation of said differential screw and a cam follower controlled by cam movement for moving said third holder.

11. The combination according to claim 10 wherein an adjustable iris diaphragm is carried by said lens holder, said diaphragm having a rotatable actuating ring for controlling the lens aperture, a cord having one end attached to a fixed point, a reel carried by said lens holder and having attached thereto the other end of said cord so that said cord causes rotation of said reel in one or other direction depending upon the movement of said lens holder and means coupling said reel and actuating ring for changing the lens aperture in accordance with the position of the lens holder.

12. In an optical system, the combination of a lens holder and object and image plane holders on opposite sides of said lens holder, tracks for supporting said holders in movable relation to each other, a differential screw having threads of opposite hand but each hand having a constant pitch, means for securing said screw parallel to said tracks for screw rotation, threaded means cooperating with the two different threads on said screw, one threaded means being coupled to said lens holder and the other threaded means being coupled to the image plane holder so that rotation of said differential screw results in a variation in the distances between the object plane holder, lens holder and image plane holder approximating those required for proper focusing relation, actuating means having a non-linear driving ratio for coupling said differential screw to the object holder for moving the latter on its track when said differential screw is operated and manually controlled means for rotating said differential screw whereby a prescribed ratio of object and image distances for proper focusing relation will be maintained automatically upon operation of said differential screw.

13. The combination according to claim 12 wherein said last named variable ratio means includes a cam linearly coupled to said differential screw and a cam follower coupled to said object holder, the combination of cam and cam follower providing the non-linear driving ratio.

14. The combination according to claim 13 wherein said lens holder carries an adjustable iris diaphragm having a rotatable actuating ring for controlling the lens aperture, and linear means responsive to the movement of said lens holder with respect to a fixed point on said system for operating said rotatable ring in accordance with the movement of said lens holder.

15. The combination according to claim 14 wherein said last named means include a cord having one end attached to said fixed point and a reel having the other end of said cord attached thereto, said cord being adapted to turn said reel in one direction or the other direction depending upon the direction and amount of movement of said lens holder along said tracks, and wherein said reel is coupled to said actuating ring for rotating the same.

References Cited in the file of this patent

UNITED STATES PATENTS

| | | | |
|---|---|---|---|
| 1,235,685 | Hansch | Aug. 7, | 1917 |
| 1,266,111 | Evans | May 14, | 1918 |
| 1,645,367 | August | Oct. 11, | 1927 |
| 1,651,648 | Gruber | Dec. 6, | 1934 |
| 1,950,166 | Durholz | Mar. 6, | 1934 |
| 2,134,757 | Goldsmith | Nov. 1, | 1938 |
| 2,239,379 | Bucky | Apr. 23, | 1941 |
| 2,464,559 | Davenport | Mar. 15, | 1949 |
| 2,483,147 | Mol | Sept. 27, | 1949 |
| 2,506,347 | Davis | May 2, | 1950 |